United States Patent [19]
Yost

[11] 3,907,679
[45] Sept. 23, 1975

[54] SEWAGE TREATMENT SYSTEM INCLUDING EFFLUENT EVAPORATOR

[75] Inventor: Kenneth J. Yost, Eaton, Ohio

[73] Assignee: Coate Burial Vault, Inc., West Milton, Ohio

[22] Filed: Mar. 26, 1973

[21] Appl. No.: 345,113

[52] U.S. Cl. ............. 210/70; 159/1 RW; 159/13 C; 159/16 R; 159/49; 203/DIG. 5; 210/151; 210/199; 210/258; 210/532 S; 261/119 R
[51] Int. Cl.² .......................................... B01D 1/04
[58] Field of Search .... 159/13 C, 13 R, 16 A, 16 R, 159/49.1 RW; 261/119 A, 119 R, 125; 210/150-152, 70, 199, 258, 532 S; 203/DIG. 5

[56] References Cited
UNITED STATES PATENTS

| | | | |
|---|---|---|---|
| 347,663 | 8/1886 | Tibbets | 61/125 |
| 385,939 | 7/1888 | Lloyd | 159/13 C |
| 848,279 | 3/1907 | Ashley | 210/150 |
| 1,115,192 | 10/1914 | Hausman | 159/13 C |
| 2,106,208 | 1/1938 | Deeley | 159/16 R X |
| 2,257,558 | 9/1941 | Whittle | 261/119 R |
| 2,432,887 | 12/1947 | Haviland | 210/532 S |
| 3,195,614 | 7/1965 | Hatfield | 159/13 C |
| 3,647,081 | 3/1972 | Engelbart | 210/150 |
| 3,698,194 | 10/1972 | Flynn | 210/532 S |
| 3,721,346 | 3/1973 | Lore et al. | 210/152 X |

FOREIGN PATENTS OR APPLICATIONS

9,605   9/1906   United Kingdom............. 261/119 R

OTHER PUBLICATIONS

Septic Tank Systems, Hancor, Inc., 1970.

*Primary Examiner*—Samih N. Zaharna
*Assistant Examiner*—Robert G. Mukai
*Attorney, Agent, or Firm*—Jacox & Meckstroth

[57] ABSTRACT

Clear effluent from an aerobic sewage treatment tank is directed into one end of an elongated conduit adapted to be buried in the ground with the tank. The conduit has a length of many hundred feet and is preferably wrapped in the form of a substantially horizontal spiral coil. The opposite end of the conduit is vented to atmosphere, and a flow of air is directed from a supply pump through the conduit over the surface of the effluent to effect evaporation of the effluent into the air stream and discharge of the vapor with the air into the atmosphere. The air is directed into the conduit in a plurality of separate streams located at longitudinally spaced intervals and after moisture is removed from the air within a pressure-condensing container. The conduit is preferably formed of a corrugated flexible tubing of plastics material and may be constructed in a plurality of stacked coil sections which are connected in series.

9 Claims, 4 Drawing Figures

US Patent  Sept. 23, 1975  3,907,679
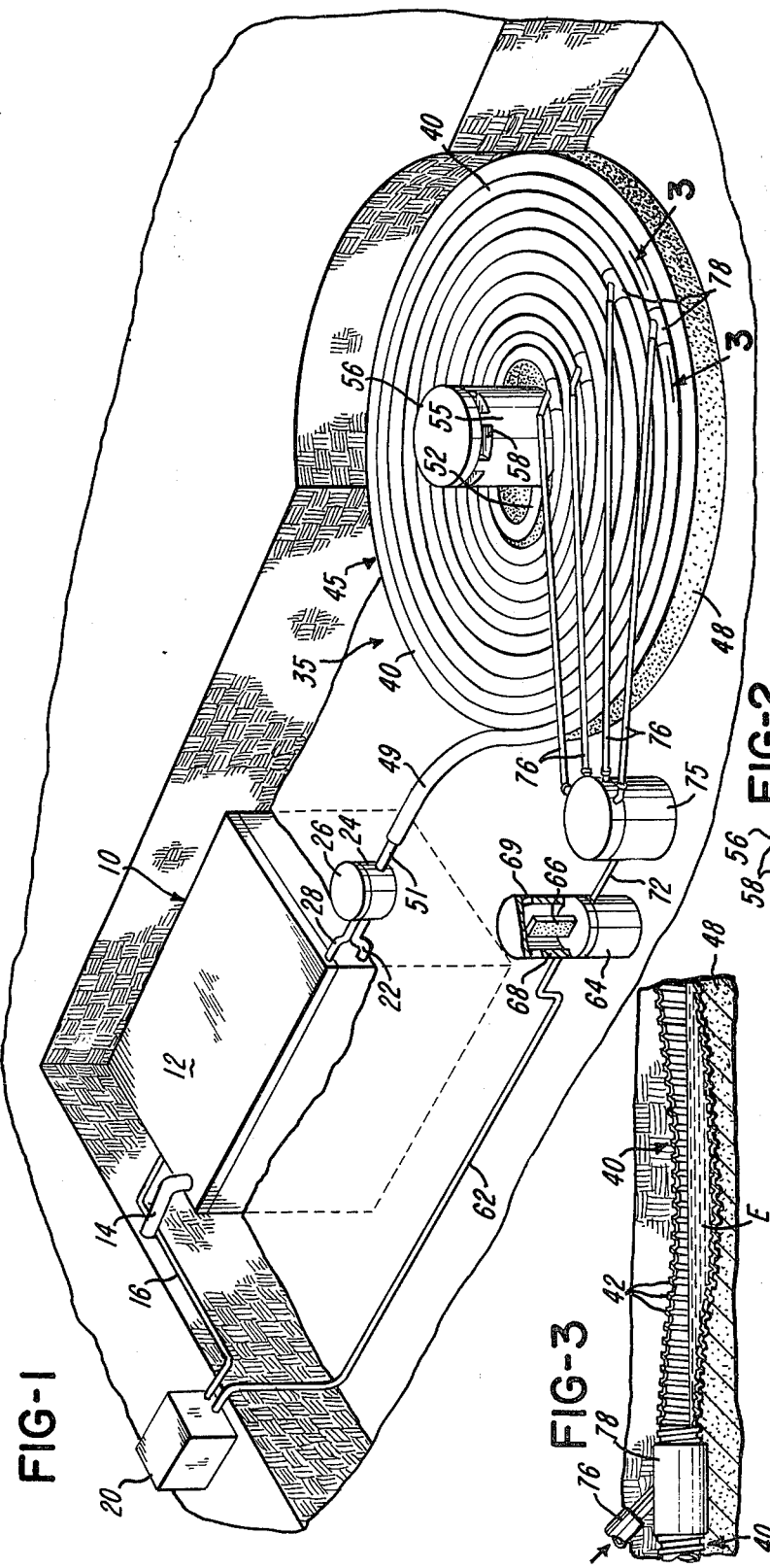
FIG-1
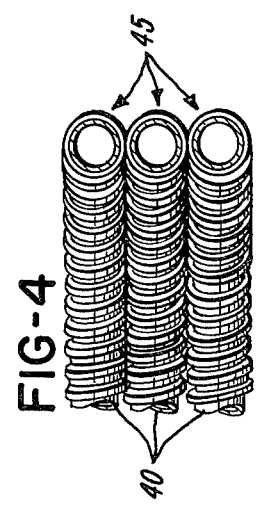
FIG-4
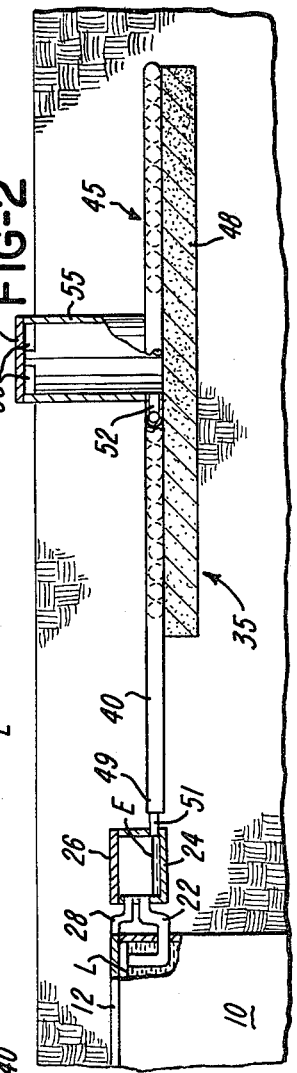
FIG-2
FIG-3

SEWAGE TREATMENT SYSTEM INCLUDING EFFLUENT EVAPORATOR

BACKGROUND OF THE INVENTION

In the use of an anaerobic sewage treatment tank, commonly referred to as a septic tank, or in the use of an aerobic sewage treatment tank, for example, as disclosed in U.S. Pat. No. 2,889,047, the discharged water or effluent from the tank is usually directed into one or more drainage lines which extend within a buried leaching bed consisting of gravel. The drainage line usually consists of a series of clay tiles defining drainage gaps therebetween or a perforated conduit of flexible plastics material. Frequently, the leaching bed is not sufficient to dissipate the water or effluent discharged from the sewage treatment tank and, as a result, the effluent percolates up through the overlying ground layer, sometimes producing an objectionable odor.

This percolating problem is especially serious in many areas where the soil includes a high clay content or the water table is only a few feet below the ground surface, thereby preventing the effluent from seeping further into the ground. Furthermore, the state health codes usually forbid directing the overflow from the leaching bed or the discharged effluent directly into a nearby stream, pond or other body of water.

It has therefore been found desirable to provide for evaporating a substantial portion of the effluent discharge from either an anaerobic or aerobic sewage treatment tank into the atmosphere so as to minimize the chances of contaminating either surface water or an underground water supply stream. However, it is important that the evaporation of the effluent be performed at a low operating cost and by a system which does not require substantial maintenance.

SUMMARY OF THE INVENTION

The present invention is directed to an improved system for evaporating the effluent discharged from a sewage treatment tank and which provides the above mentioned desirable features. In addition, the effluent evaporator system of the invention is inexpensive in construction and is simple to install either in an area adjacent the sewage treatment tank or at a location remote from the tank. Furthermore, an effluent evaporator system constructed in accordance with the invention, is effective to evaporate a substantially high percentage of the effluent, for example, above 90% of the total volume of effluent discharged from the tank.

In accordance with one embodiment of the invention, the evaporator consists of a tube or conduit of semi-flexible plastics material and having a length of over five hundred feet. The conduit is wrapped or wound into a generally flat spiral coil which is placed on a substantially horizontal sand filter bed located approximately two and one-half feet below the ground surface. The outer end of the conduit is connected to the discharge outlet of the sewage treatment tank, and the opposite or inner end of the conduit is connected to a vent riser which projects upwardly above the ground surface.

A supply of low pressure air is directed into the conduit at longitudinally spaced intervals and at radially spaced locations on the coil so that a continuous stream of air is directed within the upper portion of the conduit over the surface of the effluent received in the lower portion of the conduit. The substantial surface area exposure of the effluent to the air stream, causes the effluent to vaporize into the air stream within the conduit and be vented into the atmosphere with the air discharged from the conduit. The air is supplied from a low pressure air pump and is directed through a condenser where moisture is removed from the air. The conduit may also be arranged in a plurality of stacked sections which are connected in series and with each section receiving a corresponding series of longitudinally spaced air streams. This arrangement is used for evaporating a higher volume of effluent.

Other features and advantages of the invention will be apparent from the following description, the accompanying drawings and the appended claims.

BRIEF DESCRIPTION OF THE DRAWINGS

FIG. 1 is a perspective view of an aerobic sewage treatment tank connected with an effluent evaporator system constructed in accordance with the invention, and illustrating its installation within the ground;

FIG. 2 is an elevational view of a part of the sewage treatment tank and the effluent vaporator system shown in FIG. 1, with portions broken away;

FIG. 3 is an enlarged fragmentary section of a portion of the evaporator conduit, as taken generally on the line 3—3 of FIG. 1; and FIG. 4 is an enlarged fragmentary section showing a stacked arrangement of conduit sections employed in a modification of an evaporator system constructed in accordance with the invention.

DESCRIPTION OF THE PREFERRED EMBODIMENTS

The sewage treatment system shown in FIG. 1 includes a cast concrete digestor tank 10 which is preferably constructed in accordance with the disclosure of co-pending application Ser. No. 340,833 filed Mar. 13, 1973, and assigned to the assignee of the present invention. The tank 10 includes a generally flat cast concrete lid or cover 12 through which extends a sewage supply line 14 connected to receive the sewage from a residence, office building or the like.

As shown in the above application, the cover 12 includes embedded air supply tubes which receive a supply of low pressure air through a line 16 connected to the output of an air supply source or pump 20. In one installation, the pump 20 had a rating of 14 c.f.m. when discharging into atmosphere. The sewage is aerobically treated within the tank 10 by the surface injection of air into the sewage, and substantially clear water or effluent E (FIG. 2) is discharged from the tank through a generally U-shaped line 22 into a relatively small cylindrical inspection vessel 24 having a removable cover 26. A line 28 directs the air exhausted from the tank 10 also into the container 24.

In accordance with the present invention, the effluent or substantially clear water discharged from the aerobic digestor tank 10 into the vessel 24, is directed into an effluent evaporator system 35. The evaporator system 35 includes a long conduit 40 which is preferably formed or extruded of a polyvinyl chloride material and includes helical undulations or convolutions 42. The conduit 40 has a length of at least 250 feet and preferably greater than 500 feet. In one installation of an evaporator system 35 which provided highly satisfactory results, the conduit 40 had an inside diameter of approximately 2 inches and a length of 1,000 feet. The flexibility of the conduit 40 provides for wrapping or winding the one thousand foot conduit into the form of a generally horizontal spiral coil 45 having an overall diameter of approximately 17 feet. For purposes of simplifying the drawings, only a few turns of the conduit 40 are illustrated in the coil 45 shown in FIG. 1. The coil 45 of conduit 40 is placed on generally horizontal surface of a sand filter bed 48 which is preferably located between two feet and two and one-half feet below the surface of the ground, generally level with the surface level L (FIG. 2) of the treated sewage or water within the digestor tank 10.

The inlet end portion 49 of the conduit 40 is connected by a pipe 51 to the lower portion of the inspection vessel 24 and is adapted to receive both the effluent and low pressurized air discharged from the tank 10 into the vessel. The inner discharge end portion 52 of the conduit 40 is connected to the lower end portion of a cylindrical concrete riser 55 which has a head portion 56 projecting above the ground surface (FIG. 2). The head portion 56 has a series of circumferentially spaced vent openings 58 which provide for venting the inner end portion 52 of the conduit 42 to atmosphere. As shown in FIG. 2, the base of the riser 55 rests upon the sand filter bed 48 so that if any water does flow into the riser 55, it will seep down into the filter bed 48. While the conduit 40 is illustrated in the form of a generally circular coil 45, it is to be understood that the conduit 40 may be arranged in other configurations, for example, an oval or serpentine-shaped coil.

An air supply line 62 is also connected to the outlet of the air supply pump 20 and extends to a cylindrical concrete vessel 64 which defines an enclosed chamber for receiving the low pressure air. The vessel 64 is effective to collect and condense the moisture within the air supplied through the line 62. The moisture is removed from the vessel 62 by a wick member or pad 66 which extends from the bottom of the vessel 40 and projects upwardly through the top wall to a position generally level with the ground surface. The vessel 64 includes a riser portion 68 which has vent openings 69 within its top for venting the wick pad 66 to atmosphere.

An air line 72 extends from the vessel 64 to a cylindrical concrete manifold 75 which defines an enclosed air chamber. A plurality of air supply lines 76 extend from the top of the manifold 75 and connect with the conduit 40 at longitudinally spaced intervals by means of corresponding Y-shaped fittings 78 (FIG. 3) installed within the conduit 40. As shown in FIGS. 1 and 3, the air supply line 76 extends into the fittings 76 at an angle of approximately 45° so that the low pressure air streams are introduced to the conduit 40 in the same direction as the effluent and air is received in the inlet end portion 49 of the conduit 40 through the supply line 51.

In operation of the effluent evaporator system 35, the air discharged from the digestor tank 10 with the effluent E, is sufficient to cause the effluent to flow through the outer turn of the coil 45 in a counterclockwise direction (FIG. 1). The air flow is then supplemented by the outermost air supply line 76 so that the effluent is carried further along the length of the conduit 40, after which the air is again supplemented by the air stream supplied through the next air supply line 76. The air supplementing is repeated so that the effluent is distributed within the lower portion of the conduit 40. As a result of the irregularities in the surface of the sand filter bed 48, the evaporator conduit 40 is provided with slight dips along the length of the conduit, as illustrated in FIG. 3, so that more of the water or effluent E tends to collect within these dips.

As a result of the air streams supplied to the coil 45 of conduit 40 through the air supply lines 28 and 76, a continuous gentle air stream is produced within the conduit 40 over the surface of the effluent E, causing the effluent to evaporate. The vaporized effluent is carried with the air and is discharged from the inner end portion 52 of the conduit 40 with the air through the vent openings 58 within the riser 55. The corrugations or convolutions 42 of the conduit 40 and the arrangement of the conduit 40 within the spiral coil 45, provide for turbulating the air stream which, in turn, turbulates the flow of the effluent E within the conduit and increases the surface area exposure of the effluent to the air flow.

Referring to FIG. 4, a plurality of generally horizontal flat coils 45 of corrugated plastic conduit 20 are arranged in overlying stacked relation. This modification is particularly suited for handling higher flow rates of effluent, for example, several hundred gallons per day. The coils 45 are connected in series, and a plurality of air supply lines 76 are connected to each of the coils 45 at longitudinally spaced intervals along the length of the conduit 20. The effluent and air streams flow inwardly through the uppermost coil 45 and then outwardly through the intermediate or middle coil 45 and then back inwardly through the lowermost coil 45 for discharge or venting through the centrally located riser 55. If only two of the spiral coils 45 are required to evaporate the flow rate of effluent from the digestor tank, the effluent is initially directed into the inner end of the upper coil 45 so that effluent flows outwardly in the upper coil 45 and then inwardly within the lower coil 45 for discharge of the air-vapor through the vent riser 44. As mentioned above, if any water does flow completely through the coils 45, the water will seep into the sand filter bed 48.

From the drawing and the above description, it is apparent that a sewage treatment system incorporating an effluent evaporator constructed in accordance with the present invention, provides desirable features and advantages. For example, the evaporator system 35 is effective to use a relatively low flow rate of air, for example, 10 to 12 c.f.m. for efficiently evaporating a substantial volume of water or effluent. That is, the substantial length of the horizontally disposed conduit 40, is effective to expose a large surface area of the effluent, and the flow of air through the conduit 40 over the exposed surface area of effluent, effectively evaporates the effluent for discharge into the atmosphere.

The generally circular horizontal coil 45 of the conduit 40, simplifies the installation of the evaporator system by reducing the volume of earth which must be removed to install the coil within the ground. As mentioned above, the turbulence created within the air and water flowing within the conduit 40 as a result of the helical convolutions and the spiral arrangement of the conduit 40, increases the exposure of the effluent to the air flow and thereby increases the efficiency of evaporization of the effluent. In addition, the vessel 64 and exposed wick 66 within the air supply line 62, further provide for a simplified and inexpensive means of removing moisture from the air before the air is directed through the line 76 into the spiraling conduit 40.

While the method and form of apparatus herein described constitutes a preferred embodiment of the invention, it is to be understood that the invention is not limited to the precise method and forms of apparatus described, and that changes may be made therein without departing from the scope and spirit of the invention as defined in the appended claims.

The invention having thus been described, the following is claimed:

1. In a sewage treatment system including a tank buried within the ground and having an inlet for receiving sewage water and an outlet for discharging a substantially clear water effluent, an improved device for evaporating the effluent into the atmosphere, comprising an elongated flexible tubular conduit system of plastics material, said conduit system arranged to form a substantially flat horizontal coil buried within the ground, said conduit system having an inlet end portion connected to said outlet of said tank for receiving the effluent within the lower portion of the conduit system and for exposing a substantial surface area of the effluent along the length of said conduit system, said conduit system having an outlet end portion, means for venting said outlet end portion to the atmosphere above the ground, air supply tube means connected to said conduit system at a plurality of longitudinally spaced intervals along said conduit system, means for supplying air flow within said air supply tube means to produce a corresponding plurality of air streams into said conduit system, and said air streams being effective to produce a longitudinal flow of air in a common direction within the upper portion of said conduit system for vaporizing the effluent within said conduit system into the flow of air within said conduit system for discharge as a vapor into the atmosphere through said outlet end portion of said conduit system.

2. A sewage treatment system as defined in claim 1 wherein said coil comprises a spiral configuration.

3. A sewage treatment system as defined in claim 2 wherein said coil is substantially circular.

4. A sewage treatment system as defined in claim 1 including a plurality of said coils arranged in generally vertical stacked relation, and means connecting said coils for directing effluent and air longitudinally through each of said coils.

5. A sewage treatment system as defined in claim 4 wherein said conduit sections are connected in series.

6. A sewage treatment system as defined in claim 1 including means for directing each stream of air into said conduit system at an acute angle and in the same direction as the effluent flow.

7. A sewage treatment system as defined in claim 1 wherein said conduit system has a length of at least 250 feet.

8. A sewage treatment system as defined in claim 1 wherein said conduit system has a length of at least 500 feet.

9. A method for evaporating an effluent discharged from the outlet of a sewage treatment tank buried within the ground, comprising the steps of arranging an elongated flexible tubular conduit system to form a substantially flat coil, positioning said coil in a substantially horizontal plane within the ground, directing the effluent into the lower portion of the conduit system to expose a substantial surface area of the effluent along the length of said conduit system, directing a flow of air into said conduit system at a plurality of longitudinally spaced intervals for producing a longitudinal flow of air in a common direction within the upper portion of said conduit system over the exposed surface of the effluent for vaporizing the effluent into the air within said conduit system, and venting the vapor upwardly to atmosphere through an outlet end portion of said conduit system.

* * * * *